UNITED STATES PATENT OFFICE.

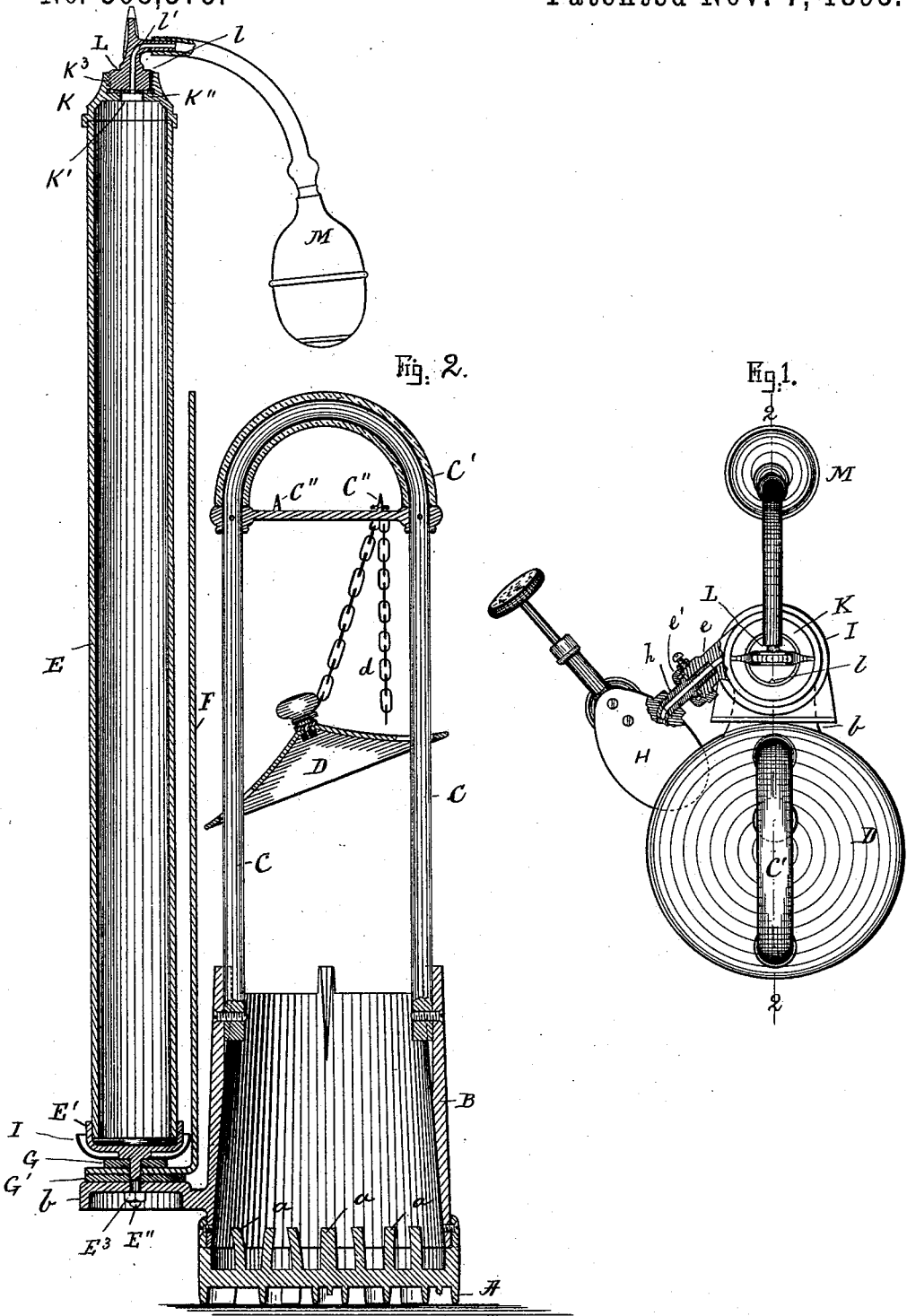

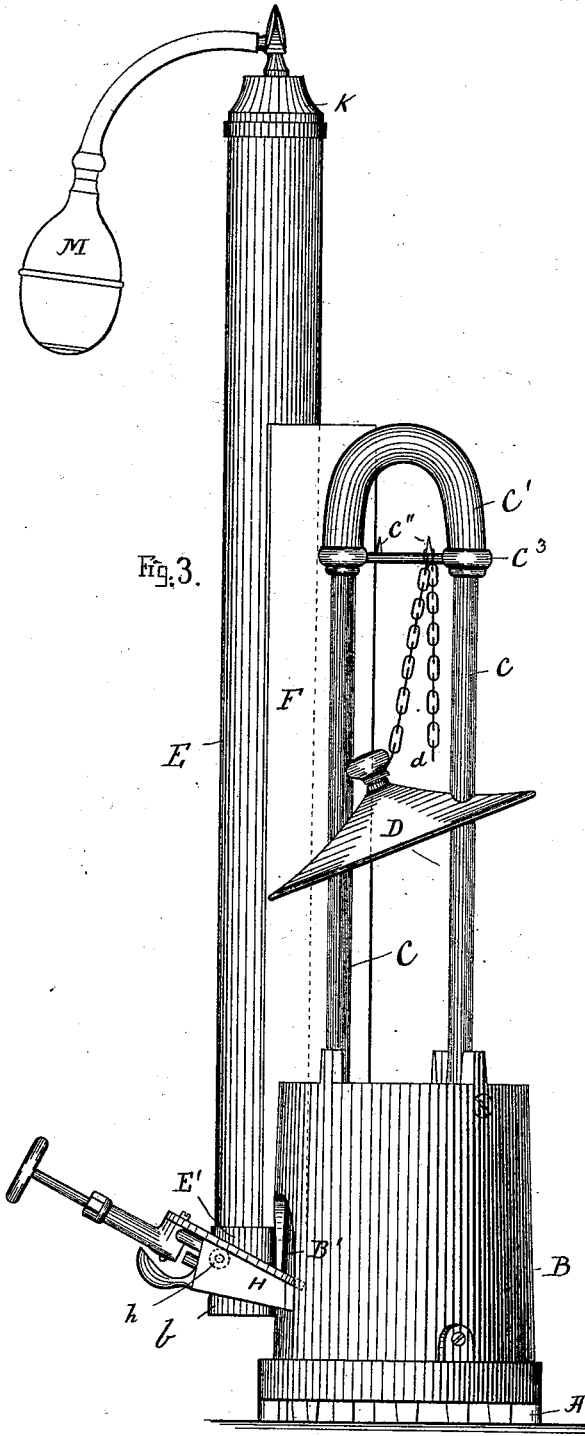

JACOB EDSON, OF BOSTON, ASSIGNOR OF ONE-HALF TO EBEN A. JACOBS, OF ARLINGTON, MASSACHUSETTS.

BRANDING DEVICE.

SPECIFICATION forming part of Letters Patent No. 508,375, dated November 7, 1893.

Application filed July 8, 1892. Serial No. 439,395. (No model.)

*To all whom it may concern:*

Be it known that I, JACOB EDSON, a citizen of the United States, and a resident of Boston, in the county of Suffolk and State of Massachusetts, have invented new and useful Improvements in Branding Devices, of which the following, taken in connection with the accompanying drawings, is a specification.

This invention relates to improvements in branding devices for the purpose of branding wooden barrels, boxes, &c., and it is carried out as follows, reference being had to the accompanying drawings, wherein—

Figure 1 represents a plan partly shown in section. Fig. 2 represents a central longitudinal section on the line 2—2 shown in Fig. 1; and Fig. 3 represents a side elevation of my improved branding device.

Similar letters refer to similar parts wherever they occur on the different parts of the drawings.

A represents the branding die to the top of which is secured in a detachable manner, the upwardly projecting shell or oven B which is open at its upper end and has secured to it the bail or handle C by means of which the apparatus is lifted and handled as it is being moved from place to place during the branding operation. The upper curved end of said bail is covered with a tube C', preferably made of rubber or suitable non-conducting material so as to enable the apparatus to be lifted and handled without burning or injuring the hands of the operator.

D is a cover for the oven B which cover is adjustable up and down on the bail C, it having for this purpose attached to it, a chain $d$ adapted to be secured to any one of the prongs or projections C'', C'', on the cross bar $C^3$ which is attached in any suitable manner to the uprights of the bail C below the ends of the rubber tube or covering C' as shown. By this arrangement the cover may be suspended above the top of the oven B in a horizontal or inclined position as may be desired; thus for instance, it may be desired to incline the cover toward the gasoline holder for heating its contents or it may be inclined in an opposite direction for conducting the heat from such gasoline holder, as occasions require. The branding die A has on its upper side, a series of vertical, inclined or curved projections $a$, $a$, $a$, of any desired form, size or shape for the purpose of increasing the heating surface of said die and thus causing it to hold its heat much longer and conduct it more rapidly to any desired point as compared with dies not provided with such heat retaining projections.

To one side of the oven B is secured a bracket $b$ preferably cast in one piece with said oven, as shown; said bracket serves as a support for the gasoline holder E and the shield F interposed between the oven and the gasoline holder as shown in the drawings.

The lower end of the holder E is soldered or otherwise secured to a closed base piece E' provided with a downwardly projecting screw E'', which passes through a perforation in the horizontal portion of the shield F and a perforation in the bracket $b$ and is secured to said parts by means of the nut $E^3$ as shown in Fig. 2.

G is a non-conducting packing interposed between the under side of the base piece E' and the foot of the shield F; G' is a similar non-conducting packing interposed between the foot of the shield F and top of the bracket $b$, the object of such packings being to prevent the heat of the oven from being communicated to said gasoline holder.

The shield F serves as a means to prevent the radiated heat of the oven from being communicated to the gasoline holder, thus keeping the latter from being over heated.

B' is a side opening in the oven B for the purpose of allowing the flame from the burner H to reach the interior of the oven, and the upper surface of the branding die. Said burner may be made of any well known form or construction and need not here be described in detail. To one side of said burner is attached its supply pipe $h$ which is journaled in a socket $e$ on the base piece E' and provided with a stuffing box $e'$ for preventing leakage at such union between the holder and burner. By having the burner journaled to the base of the gasoline holder, it may be swung and adjusted in a vertical plane so as to direct the flame from said burner to any desired part of the upper surface of the branding die.

To the base of the gasoline holder is secured an annular cup or receptacle I adapted to hold water to cool off the holder, shield or burner or adjacent parts of the device whenever it may be desired so to do.

The position of the shield F as well as the burner H relative to the oven may be adjusted simply by loosening the nut $E^3$ and swinging the holder and its burner or the shield in a horizontal plane to the desired positions after which the parts aforesaid are firmly secured in place by the tightening of said nut $E^3$.

To the upper end of the holder E is secured a hollow cap K, having a filling opening $K'$, a valve seat $K''$ and an internally screw threaded portion $K^3$ above such seat as shown in Fig. 2.

L is a screw threaded valve plug adapted to be screwed against the valve seat $K''$ after the holder has been filled with gasoline or other hydro-carbon; said plug has on its screw threaded portion a small groove or vent $l$ by means of which the internal pressure in the holder E can be ascertained whenever so desired; for this purpose it is only necessary to unscrew the plug L sufficiently to raise it from its seat $K''$ when a portion of the gas in the upper part of the holder E will escape through the groove or vent $l$ on the side of the plug L. The approximate pressure may be determined by the sound of the escaping gas or by holding one's hand above the vent $l$. If the pressure is too high a proper amount of gas may be let out to reduce it. If the pressure is too low, air may be forced in by means of any suitable air forcing device; particularly this may be necessary when starting the branding operation.

M represents a suitable air forcing device having its tube connected to a perforation $l'$ in the plug L as shown in Fig. 1.

In using the device the burner is lighted as usual and its position regulated so as to throw the flame against the upper surface of the branding die and when the latter is heated to the desired temperature, the apparatus is placed on the box or barrel, &c., that is to be branded causing the marks, figures or letters of the die to be burned in the wood after which the device is removed and placed upon another box or barrel to be branded and so on.

Having thus fully described the nature, construction, and operation of my invention, I wish to secure by Letters Patent and claim—

1. The combination in a branding device, of an oven shell, a branding die secured to the lower end of the shell, and having branding marks on its under side, and heat-holding projections on its upper side, a supporting bracket extending from the oven shell, a gasoline holder mounted on the supporting bracket, a burner connected with the gasoline holder, and adapted to introduce a flame into the oven shell, and a movable cover for said oven, substantially as described.

2. In a branding device, the combination of a branding die having an oven secured thereto, a burner for heating the oven, a bail secured to the oven, and provided with a cross-bar having prongs, and a cover having means for suspending it from the prongs of the cross-bar, substantially as described.

3. In a branding device, the combination of a branding die, having an oven secured thereto, a burner for heating the oven, a bail connected with the oven, and having a cross-bar provided with prongs, a movable cover for the oven, and a chain secured to the cover, and adapted to adjustably engage the prongs on the said cross-bar for adjusting the cover, substantially as described.

4. In a branding device, the combination with a branding die having an oven secured thereto, and a gasoline holder connected with said oven, of a burner adapted to swing in a vertical plane, and pivotally mounted on the gasoline holder at a point outside the oven, substantially as described.

5. In a branding device, the combination with a branding die having an oven secured thereto, and provided with an opening in one side, a movable cover for the oven, a gasoline holder supported by the oven, and a burner pivotally mounted on the gasoline holder at a point outside the oven, and having its delivery end extending through the opening therein, substantially as described.

In testimony whereof I have signed my name to this specification, in the presence of two subscribing witnesses, on this 30th day of June, A. D. 1892.

JACOB EDSON.

Witnesses:
ALBAN ANDRÉN,
LAÜRITZ N. MÖLLER.